United States Patent [19]

Davis

[11] Patent Number: 5,153,582
[45] Date of Patent: Oct. 6, 1992

[54] METHOD OF AND APPARATUS FOR ACKNOWLEDGING AND ANSWERING A PAGING SIGNAL

[75] Inventor: Walter L. Davis, Coral Springs, Fla.

[73] Assignee: Motorola, Inc., Schaumburg, Ill.

[21] Appl. No.: 394,254

[22] Filed: Aug. 7, 1989

Related U.S. Application Data

[63] Continuation-in-part of Ser. No. 214,569, Jul. 1, 1988, abandoned.

[51] Int. Cl.$^5$ .................................................. G08B 5/22
[52] U.S. Cl. ........................ 340/825.440; 340/311.1; 340/825.47; 340/825.48
[58] Field of Search ................ 455/31, 33, 54, 57; 340/311.1, 313, 314, 825.44, 825.47, 825.48

[56] References Cited

U.S. PATENT DOCUMENTS

| | | | |
|---|---|---|---|
| 4,172,969 | 10/1979 | Levine et al. | 340/825.69 X |
| 4,247,908 | 1/1981 | Lockhart, Jr. et al. | 455/31 |
| 4,354,252 | 10/1982 | Lamb et al. | 455/31 X |
| 4,356,484 | 10/1982 | Eckhardt | 455/31 X |
| 4,415,065 | 11/1983 | Sandstedt | 340/825.44 X |
| 4,696,054 | 9/1987 | Tsugei et al. | 340/825.44 X |
| 4,823,123 | 4/1989 | Siwiak | 340/825.44 |

Primary Examiner—Ulysses Weldon
Attorney, Agent, or Firm—Daniel R. Collopy; William E. Koch; Thomas G. Berry

[57] ABSTRACT

A paging system with a remote pager which includes a transmitter with a plurality of individually selectable encoded acknowledge signals. The system includes apparatus at the paging terminal for composing messages with a primary message and a plurality of alternate responses, each response corresponding to one of the acknowledge signals. Upon reception of the page, the pager is operated by selecting the acknowledge signal corresponding with the desired response to the primary message. Transmission of the selected acknowledge signal acknowledges reception of the page and, simultaneously, answers the primary message.

6 Claims, 6 Drawing Sheets

5,153,582

METHOD OF AND APPARATUS FOR ACKNOWLEDGING AND ANSWERING A PAGING SIGNAL

This is a continuation-in-part of application Ser. No. 07/214,569, filed Jul. 1, 1988 now abandoned.

BACKGROUND OF THE INVENTION

The present invention pertains to paging systems and more specifically to paging systems in which the pager is capable of responding with an acknowledge signal and an answer when a caller initiated, response requested page has been received.

In many paging systems it is desirable to know when a page has been received by a designated pager. Due to the power and energy dissipation limits imposed by the small size of the batteries used in paging receivers, the power level and transmission time that can be used to send signals acknowledging receipt of the page are extremely limited. Because the power level and transmission time during which RF signals can be transmitted are very limited, the coding scheme must be very simple.

In many instances the person having the page transmitted to the paging receiver desires additional information from the person being paged. In these instances it would be extremely advantagous if the additional information could be transmitted with the acknowledge signal.

SUMMARY OF THE INVENTION

It is an object of the present invention to provide a new and improved method and apparatus for acknowledging the receipt of paging signals in a paging system.

It is a further object of the present invention to provide a method and apparatus for simultaneously acknowledging receipt of the signal and responding with an answer.

It is a further object of the present invention to provide a new and improved method and apparatus which will optimize the information that can be conveyed by utilizing an acknowledge signal to both acknowledge receipt of the page and indicate a user selected response to the page.

These and other objects are realized in a paging system including a remote pager, a central transmitter which transmits messages in the form of paging signals including a caller initiated question and a plurality of caller initiated responses, and an acknowledge receiver for receiving an acknowledge signal transmitted from the remote pager and indicative of a user selected one of the plurality of responses.

BRIEF DESCRIPTION OF THE DRAWINGS

Referring to the drawings.

DESCRIPTION OF THE PREFERRED EMBODIMENT

Figure 1:
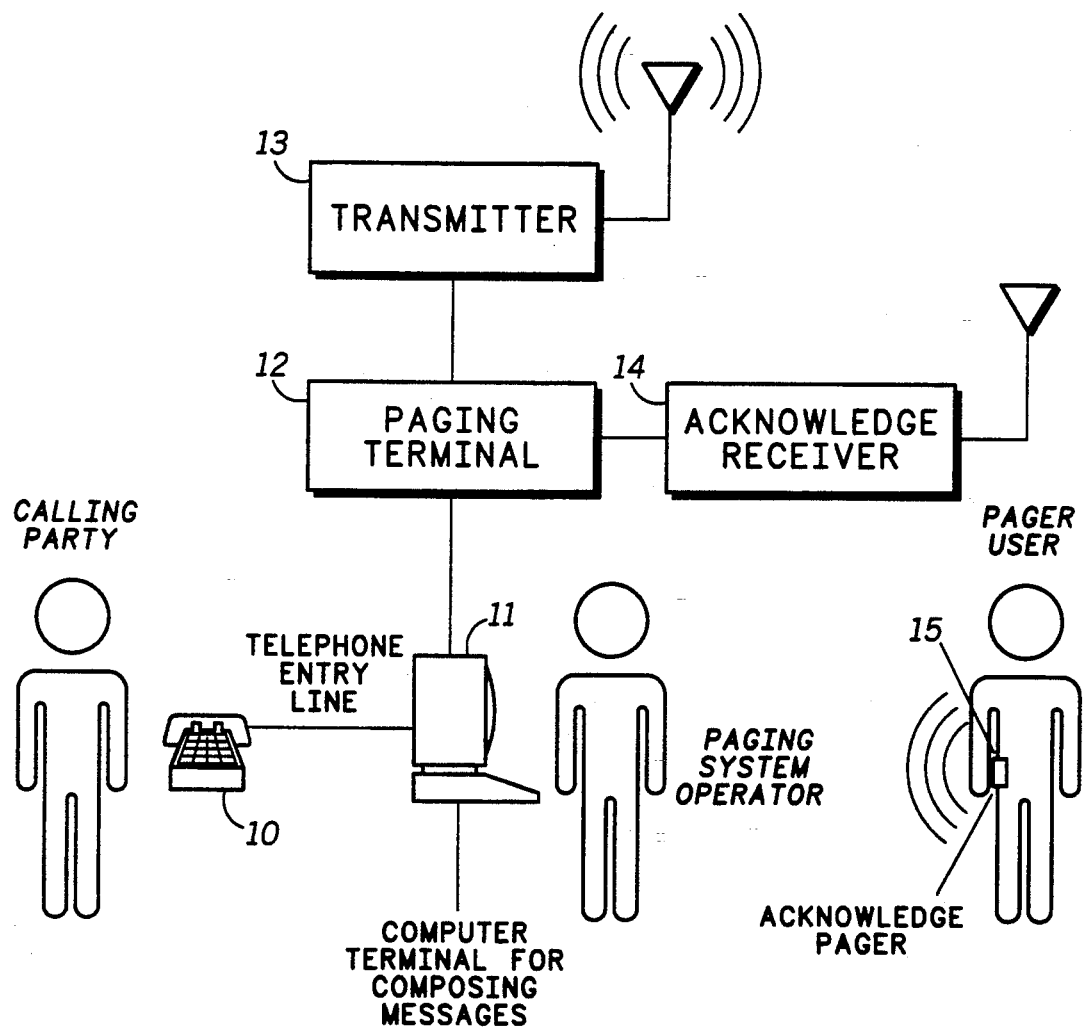
FIG. 1 is a simplified block diagram of a paging system, including a remote pager having transmission capabilities, embodying the present invention.

Referring specifically to FIG. 1, a paging system is illustrated which embodies the present invention. The paging system includes a telephone 10 which is utilized by a calling party to initiate a page. Telephone 10 is coupled to a computer terminal 11 by means of a standard telephone line. Computer terminal 11 is controlled by a paging system operator who composes messages on the computer terminal in response to messages from the calling party on telephone 10. Computer terminal 11 is coupled through a paging terminal 12 to a central transmitter 13 and an acknowledge receiver 14. It will of course be understood by those skilled in the art that transmitter 13 and receiver 14 may be in a single unit utilizing a single antenna or they may actually be positioned remotely from each other. For example, in any specific area it may be advantagous to interconnect a plurality of spaced apart receivers in a network around the area to reduce the amount of power required for a pager to reach any specific receiver. The system further includes at least one remotely located pager 15.

Figure 2:
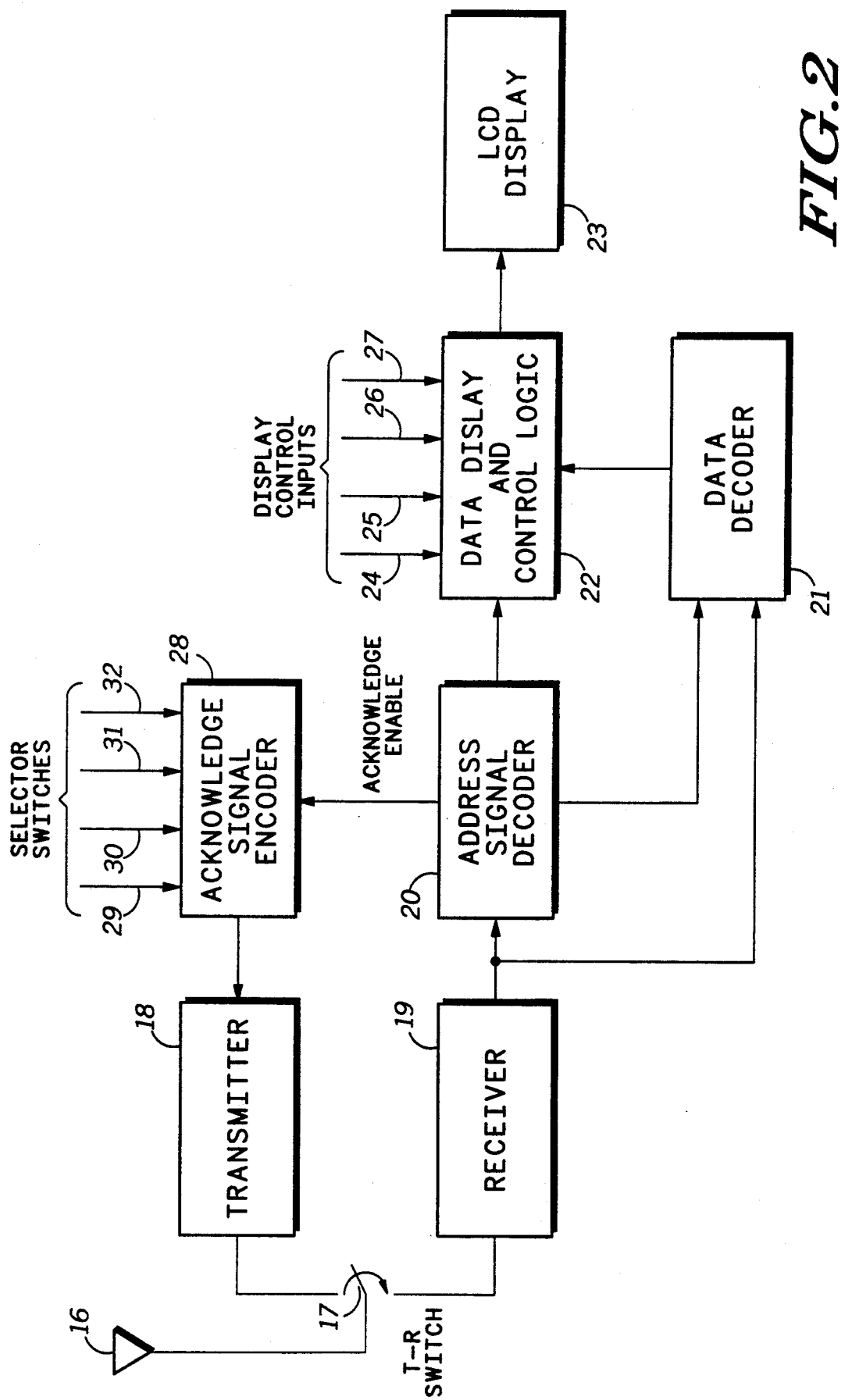
FIG. 2 is a simplified block diagram of the remote pager illustrated in FIG. 1.

Referring specifically to FIG. 2, the remote pager 15 is illustrated in simplified block form. The pager 15 includes an antenna 16 coupled through a transmit/receive switch 17 to either a transmitter 18 or a receiver 19. Antenna 16, switch 17, transmitter 18, and receiver 19 operate in the normal well known fashion and will not be elaborated upon further.

The output of receiver 19 is coupled to an address signal decoder 20 and to a data decoder 21. The output of data decoder 21 is coupled to a data display and control logic circuit 22, which in turn controls an LCD display 23. A plurality of display control inputs 24 through 27 are coupled to the data display and control logic circuit 22 from external controls which will be described presently. Address signal decoder 20 provides enable signals to data decoder 21, data display and control logic circuit 22, and an acknowledge signal encoder 28. The output of acknowledge signal encoder 28 is coupled to a modulation input of transmitter 18. Acknowledge signal encoder 28 also has a plurality of inputs 29 through 32 from a plurality of message selector controls which will be described presently.

Figure 3:
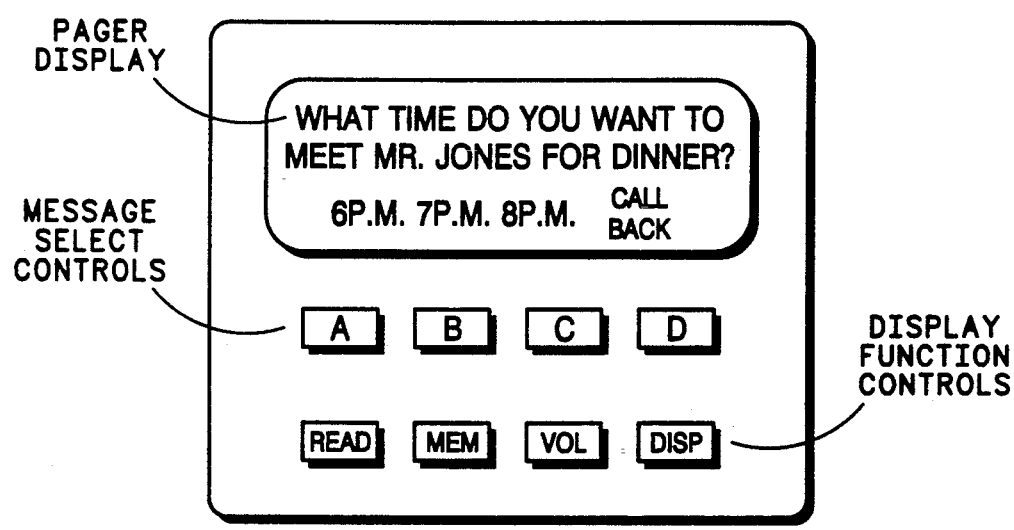
FIG. 3 is a view in top plan of the display and control of the pager of FIG. 1.

Referring specifically to FIG. 3, a plan view of the display 23 and controls of pager 15 is illustrated. A plurality of switches A, B, C, and D are illustrated as the message selector controls for inputs 29 through 32, respectively, of acknowledge signal encoder 28. The switches A through D may be simple push button switches, toggle switches or any other type of switch which may be utilized for the purposes to be described presently. Four display function controls, READ, MEMORY, VOLUME, and DISPLAY, are included on the control panel on pager 15 and are connected to inputs 24 through 27, respectively, of data display and control logic circuit 22. Data display and control logic circuit 22 contains a memory and the circuitry required to store and format a message for proper display by LCD display 23. The READ function control provides a signal on input 24 which causes control logic circuit 22 to bring a message from the memory and supply it to LCD display 23. The function control labelled MEMORY provides a signal on input 25 to cause control logic circuit 22 to store the next message received from data decoder 21 in the memory. The function control labelled VOLUME provides a signal on input 26 to logic circuit 22 which changes the volume, in a prescribed direction, of any acoustic signaling device that may be coupled to logic circuit 22 in addition to LCD display 23. Finally, the function control labelled DISPLAY supplies signals to logic circuit 22 on input 27 to cause logic circuit 22 to change the brightness of display 23.

Each of the message selector switches A, B, C, and D, supply signals to acknowledge signal encoder 28 which cause encoder 28 to supply a different code to transmitter 18 for modulating the RF signal produced thereby. It will of course be understood by those skilled in the art that there are a great variety of codes which may be utilized by acknowledge signal encoder 28, including a simple digital code, frequency or amplitude modulation, or any of a variety of other well known schemes. It will also be understood that the message selector switches A, B, C, and D, can simply be push button switches which automatically cause an encoded transmission upon depression thereof or they could be a type of toggle switch which simply controls acknowledge encoder 28 and transmission occurs in response to a transmission switch (not shown) which is operated after the message selector controls are properly positioned. In this preferred embodiment the message selector switches A, B, C, and D, are simple push button switches which automatically cause a transmission upon the depression thereof, which transmission is encoded with a simple digital code.

Figure 4:
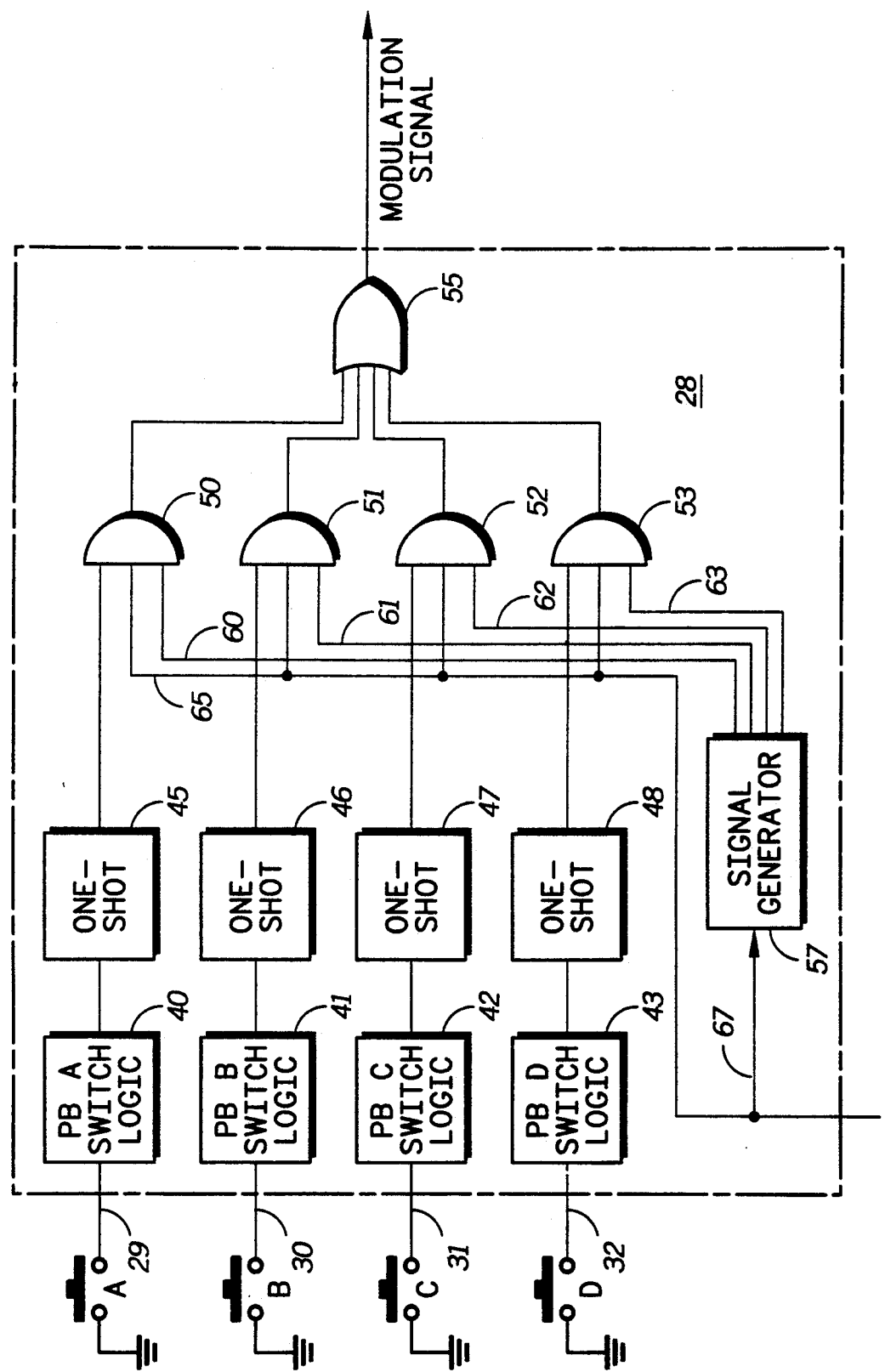
FIG. 4 is a block diagram schematic of an acknowledge signal encoder suitable for embodying in the paging receiver embodiment of FIG. 2.
Figure 5:
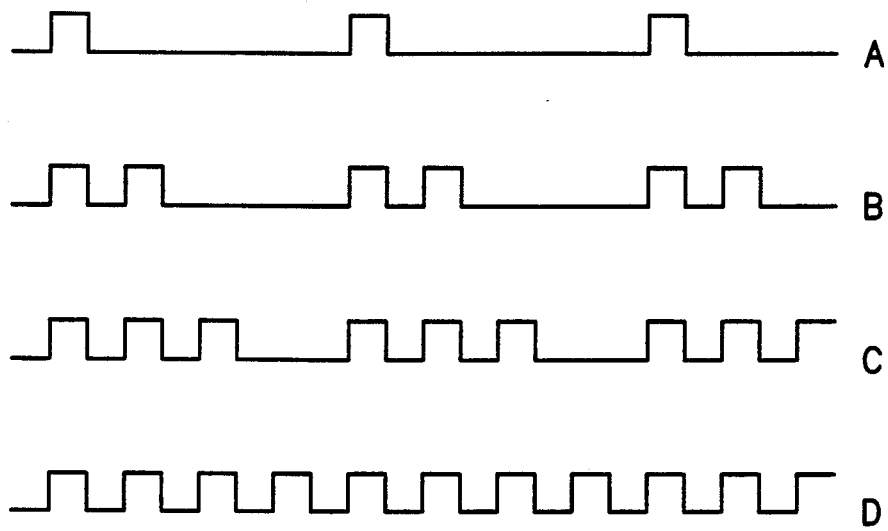
FIG. 5 includes waveforms A-D exemplifying simple digitally coded signals which may be generated by the acknowledge signal encoder embodiment depicted in FIG. 4.

Referring to FIG. 4 which depicts a suitable embodiment of the encoder 28, pushbutton switches A-D may be coupled over their respective signal lines 29-32 to respective switch logic circuits 40-43 which are of the conventional variety operative to condition the switch induced signalling from such effects as contact bounce, for example. In the present embodiment, the resultant signals of the logic circuits 40-43 may be coupled respectively to conventional one-shot multi-vibrator circuits 45-48 having outputs coupled respectively to one input each of AND gates 50-53. The outputs of the AND gates 50-53 are coupled respectively to four inputs of an OR gate 55 which effects the modulation signal conducted to the modulation input of the transmitter 18. The encoder 28 may also include a signal generator 57 for producing a digitally encoded signal corresponding to each of the AND gates 50-53, which signals may be each conducted respectively to another input of such AND gates over the signal lines 60-63. An example of simple digitally coded signals which may be produced by the generator 57 corresponding to signal lines 60-63 are shown by the waveforms A-D, respectively, of FIG. 5. The acknowledge enable signal effected by decoder 20 may be coupled to another input of the AND gates 50-53 over signal line 65 and also to the signal generator 57 over signal line 67.

An example of operation is as follows: When the enable signal is generated by the decoder 20, it may cause the signal generator 57 to produce the set of digitally encoded signals which are supplied to the inputs of the gates 50-53 over the respectively corresponding signal lines 60-63. The enable signal also enables the gates 50-53 over signal line 65. Accordingly, when one of the pushbutton switches A-D is depressed, a signal conducted over the respective line 29-32 is conditioned by the respective logic circuit 40-43 and causes a pulse of a given duration to be generated by the respective one-shot circuit 45-48 and conducted to the respective AND gate 50-53 to enable such AND gate to pass the corresponding digitally encoded signal. In response, the OR gate 55 effects a modulation signal based on the selected digitally encoded signal which is conducted to the transmitter 18 to modulate the signal transmitted thereby. Thus, an acknowledge back signal may be transmitted by the paging receiver via transmitter 18, which signal being indicative of the pushbutton A-D depressed by the user of the paging receiver, i.e. indicative of a user selected response.

Figure 6:
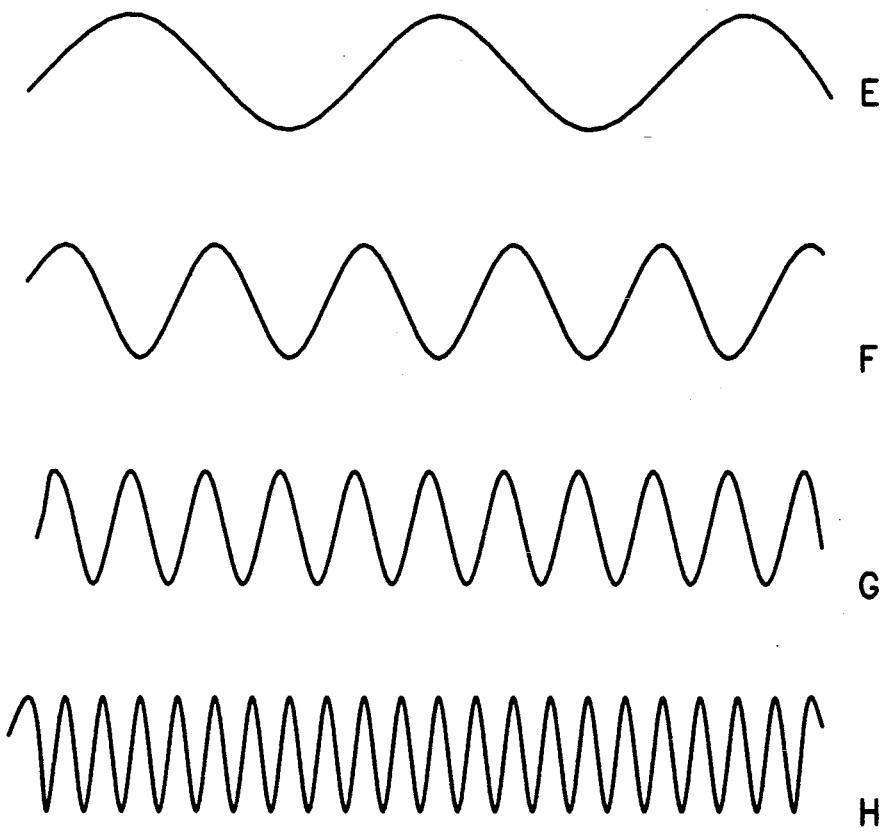
FIG. 6 includes waveforms E-H exemplifying frequency coded waveforms which may be generated by an alternate embodiment of an acknowledge signal encoder.

An alternate embodiment of an acknowledge signal encoder 28 may comprise a signal generator 57 which produces a set of frequency coded signals over signal line 60-63, a simplified example of which being shown by the waveforms E-H, respectively, of FIG. 6. In this embodiment, the AND gates 50-53 may be replaced with analog gates which are governed by the enable signal over signal lines 65 and respective signals effected by the pushbuttons A-D as described in connection with the embodiment of FIG. 4. In this example, the signal transmitted by the transmitter 18 may be frequency modulated to indicate the pushbutton A-D depressed by the user.

Figure 7:
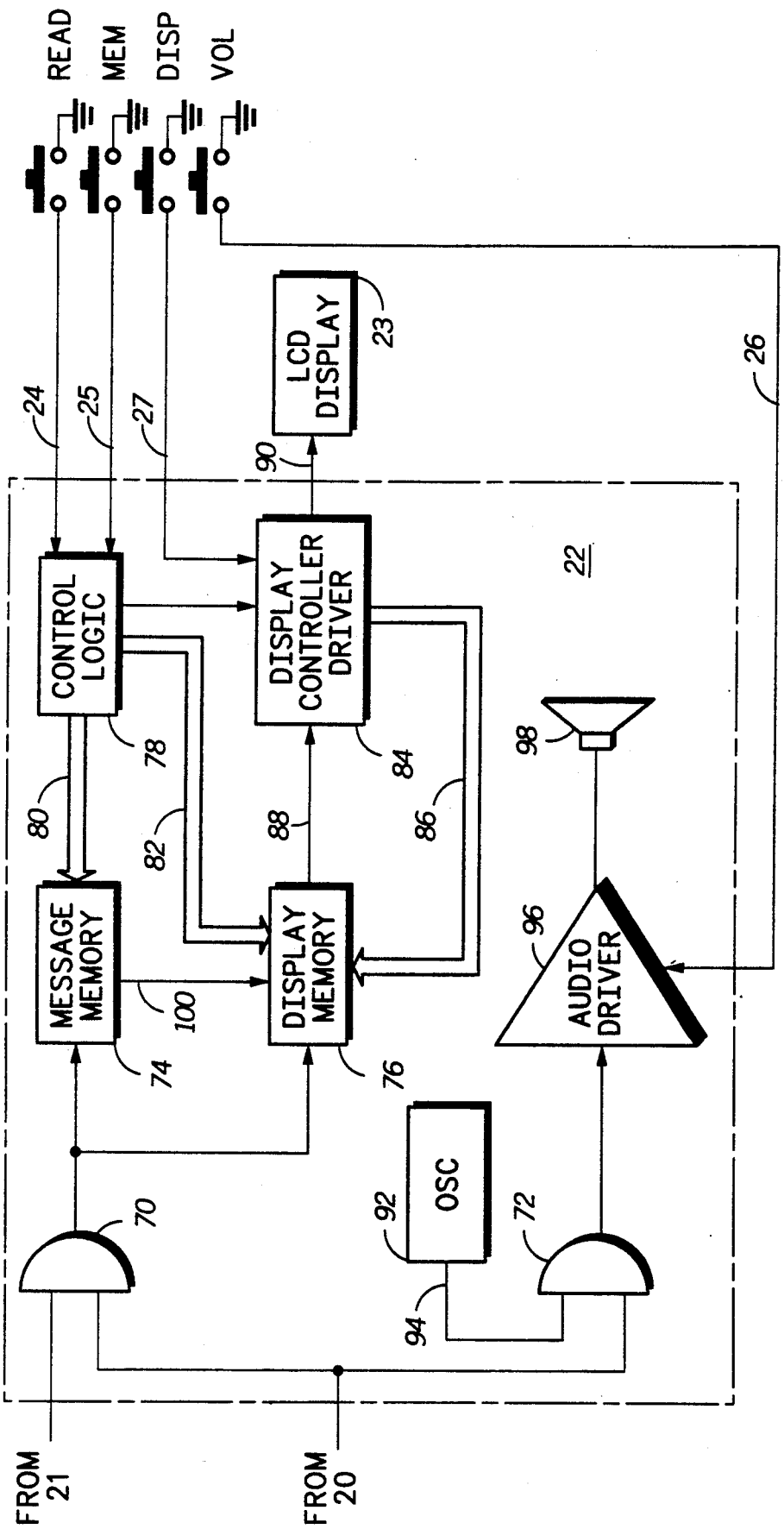
FIG. 7 is a block diagram schematic of a data display and control logic section suitable for embodying in the paging receiver embodiment of FIG. 2.

Continuing, in FIG. 7 is a block diagram schematic of a data display and control logic section of a paging receiver suitable for embodiment in the paging receiver of FIG. 2. For example, the data conducted from the decoder 21 may be provided to one input of an AND gate 70 and the enable signal generated from the decoder 20 may be provided to another input of the AND gate 70 and to one input of another AND gate 72. The output of the AND gate 70 may be coupled to a message memory 74 and a display memory 76. A control logic block 78 may be coupled to the message memory 74 through address and control lines 80 and may also be coupled to the display memory 76 over address and control lines 82. A display controller/driver section 84 may be coupled to the display memory by address and control lines 86 and also data lines 88. The controller/driver 84 may also be coupled to the LCD display 23 over a signal line 90.

Still further, an oscillator circuit 92 is operative to generate an oscillation signal in the audio range which may be conducted to another input of the AND gate 72 over signal line 94. The output of the AND gate 72 may be coupled to the input of an audio driver circuit 96 which drives an audio transducer 98. In operation, the enable signal from the decoder 20 permits the audio oscillation signal over signal line 94 to pass through the AND gate 72 to govern the audio driver 96 to drive the audio transducer 98 to audibilize the oscillation signal. The volume of the generated tone may be controlled by the VOLUME pushbutton via signal line 26 which may be conducted to the audio driver 96.

An example of operation of the display of messages in accordance with the illustrative embodiment of FIG. 7 is as follows: As the data message is conducted from the decoder 21, the enable signal is generated from the decoder 20 and permits the data to pass through the gate 70 to the memory 74 and memory 76. The control logic 78 is governed by the READ and MEMORY pushbuttons via signal lines 24 and 25, respectively, to control the storage of the data passing through AND gate 70 in either the memory 74 or memory 76 utilizing the signal lines 80 or 82, respectively.

For example, if the READ pushbutton is depressed, a signal is conducted over signal line 24 which governs the logic 78 to access memory 76 and store the incoming data through AND gate 70 therein whereupon it may be directly displayed on the LCD display 23 as will be described presently. Conversely, if the MEMORY pushbutton is depressed, a signal is conducted over line 25 to govern the logic circuit 78 to access memory 74 using signal lines 80 in which case the data may be stored in the message memory 74. Subsequently, a stored message in the memory 74 may be read by depressing the READ pushbutton which governs the logic 78 to read the data message from memory 74 using signal lines 80 to memory 76 using signal lines 82, such data being conducted over signal lines 100.

The display of data to the LCD display 23 from the memory 76 is controlled by the controller/driver circuit 84 which utilizes address and control lines 86 to conduct data over signal line 88 which is conditioned and formatted by the circuit 84 and supplied to the display 23 over signal line 90 in the proper display format (refer to FIG. 3, for example). The intensity of the display may be controlled by the DISPLAY pushbutton which causes a signal to be conducted over signal line 27 to the controller/driver circuit 84 for such purposes. For more details of a data display and control logic section of a paging receiver, reference is made to the instruction manual "PMR 2000" bearing number 68-P81048C70-0 which was published by Motorola, Inc. in December, 1986 and is incorporated by reference herein for providing such details.

In the operation of the paging system, a calling party contacts the paging system operator at computer terminal 11 by means of telephone 10. He requests a page of a specific pager, for example pager 15, and further requests the paging system operator compose a message asking the owner of pager 15 what time he would like to meet Mr. Jones for dinner. In addition to the primary message (the question), the calling party provides the paging system operator with a number of alternate responses, or times, he will be available for dinner; 6pm, 7pm, or 8pm. The calling party further instructs the paging system operator that in the event none of these times are available to the pager user being contacted that he should call back the calling party. The paging system operator composes a message on computer terminal 11 which includes the primary message and the alternate responses as shown on LCD display 23 of FIG. 3. The message is transmitted by way of paging terminal 12 and transmitter 13 to pager 15.

The message, which also contains a pager address, is received by receiver 19 and supplied to address signal decoder 20 and data decoder 21. Address signal decoder 20 decodes the address portion of the message and, if the address is the same as pager 15, supplies an acknowledge enable signal to acknowledge signal encoder 28, an enable signal to data display and control logic 22 and an enable signal to data decoder 21. When data decoder 21 receives the enable signal from address signal decoder 20 the message from receiver 19 is decoded and the data is supplied to logic circuit 22. Since logic circuit 22 has also received an enable signal, the decoded message activates an acoustic signal or other alert device in pager 15 and is supplied to the memory forming a portion of data display and control logic 22. When the pager user hears the acoustic signal and operates the READ control the message appears at LCD display 23 of pager 15 as illustrated in FIG. 3.

Upon reading the message on the pager LCD display 23, the pager user determines a response to the question and selects a message selector switch A, B, C, or D which corresponds with the answer he desires to transmit i.e. switches A, B, C, and D are correlated with the displayed responses 6 PM, 7 PM, 8 PM, and call back, respectively. The pager user than depresses the message selector switch which automatically transmits an encoded message from transmitter 18 to acknowledge receiver 14 to both acknowledge receipt of the paging signal and indicate the user designated response to the question thereof. The received response is conducted through paging terminal 12 to computer terminal 11. Computer terminal 11 matches the received encoded signal with the corresponding alternate response, i.e. 6pm, 7pm, 8pm, or call back, and provides the alternate response to the paging system operator by means of a display or the like. The paging system operator then provides the calling party with the selected alternate response. It should be understood that the message from the pager might be interpreted by the computer terminal and an appropriate recorded voice response (or other response signal) relayed to the calling party without intervention by the paging system operator. Thus, the pager has provided an acknowledge signal as well as at least a partial response to the question of the calling party.

While no specific message coding format has been described herein it will be understood by those skilled in the art that a variety of message formats may be utilized. A typical message format which might be utilized in the present paging system is described in the book entitled "A Standard Code for Radiopaging" published in July of 1979 wherein the international name for POCSAG is "CCIR Radiopaging Code No. 1 (Rec 584, Geneva, 1982, POCSAG-Code); U.S. Pat. No. 4,518,961, entitled "Universal Paging Device with Power Conservation", issued May 21, 1985; and a copending PCT patent application entitled "System for Off-The-Air Reprogramming of Communication Receivers", bearing Ser. No. PCT/US87/00004, filed Jan. 2, 1987, and all incorporated herein by reference.

The present invention optimizes the information that can be conveyed with a limited set of acknowledge signals by assigning a variable set of meanings to each acknowledge signal. This functional assignment is accomplished by transmitting the meaning of each of the return signals as part of the initial paging signal. Since the central transmitter is not handicapped by limited power and/or time, the transmission of the additional portion of the message is not a problem. While the pager illustrated utilizes an LCD display, it will be understood by those skilled in the art that other types of indicators might be utilized, such as a simple voice speaker, although this would not be as desirable as the described display because of the possibility of errors and the like.

Thus, a method and apparatus for acknowledging reception of a paging signal and simultaneously responding with at least a partial answer is disclosed. Since the central transmitter transmits the message and a plurality of possible or alternate responses the battery of the remote pager is used for only a minimum response signal. Also, the maximum amount of information can be conveyed by the minimum response signal.

While I have shown and described a specific embodiment of this invention, further modifications and improvements will occur to those skilled in the art. I desire it to be understood, therefor, that this invention is not limited to the particular form shown and I intend in the appended claims to cover all modifications which do not depart from the spirit and scope of this invention.

What I claim is:

1. In a paging system which receives messages initiated by a caller, and transmits the caller initiated messages in the form of paging signals by a central transmitter of a paging terminal to a remote pager of at least one caller selected user, said remote pager having transmission capability to transmit a signal back to an acknowledge receiver of the paging terminal, a method of acknowledging reception of a caller initiated, response requested paging signal transmitted from the central transmitter to the remote pager, said method comprising the steps of:

transmitting the paging signal including a caller initiated message from the central transmitter to the remote pager of a caller selected user, which message including a caller composed question and a plurality of caller composed responses to said question;

receiving the transmitted message with the remote pager of the at least one selected user;

visually displaying on the selected user's remote pager the caller composed question and corresponding plurality of responses of the received message;

designating to the selected user's remote pager a user selected response from said displayed plurality of responses; and acknowledging reception of the transmitted message by transmitting from the selected user's remote pager to the acknowledge receiver a signal indicative of the user designated response to the question of said message.

2. A method of transmitting a signal from a paging receiver of a user acknowledging reception of a caller initiated, response requested page and simultaneously indicating a user designated response to said page, said method comprising the steps of:

receiving with the paging receiver a paging signal including a message containing a caller composed question and a plurality of caller composed responses to the question;

visually displaying on the paging receiver the caller composed question and corresponding plurality of responses of the received message;

designating to the paging receiver a user selected response from said displayed plurality of responses; and transmitting a signal from the paging receiver to acknowledge receipt of the paging signal, said transmitted signal being indicative of the user designated response to the question of the received paging signal.

3. In a paging system having a paging terminal responsive to a caller initiated message including a caller composed question and a plurality of caller composed responses to said question to transmit said message in the form of a paging signal, a paging receiver remotely located from said paging terminal comprising:

means for receiving said paging signal including said caller initiated message;

means for visually displaying the caller composed question and corresponding plurality of responses of said received message to a user;

means operative by said user to designate a user selected response from said displayed plurality of responses; and means responsive to the user designation of said operative means for transmitting a signal acknowledging reception of said paging signal, which acknowledge signal also being indicative of the response to the question designated by the user.

4. The paging receiver in accordance with claim 3 wherein the displaying means include a visual display screen.

5. The paging receiver in accordance with claim 3 wherein the designating means include a plurality of switches operative by the user.

6. The paging receiver in accordance with claim 5 wherein the transmitting means includes means for modulating the acknowledge signal based on the operation of the plurality of switches by the user.

* * * * *